A. C. FERRIER.
HORSESHOE CLAMP.
APPLICATION FILED MAY 1, 1918.

1,288,546.

Patented Dec. 24, 1918.

Inventor
A. C. Ferrier
By Watson E. Coleman
Attorney

UNITED STATES PATENT OFFICE.

ANDREW C. FERRIER, OF INDIANA, PENNSYLVANIA.

HORSESHOE-CLAMP.

1,288,546.

Specification of Letters Patent.  Patented Dec. 24, 1918.

Application filed May 1, 1918.  Serial No. 231,896.

*To all whom it may concern:*

Be it known that I, ANDREW C. FERRIER, a citizen of the United States, residing at Indiana, in the county of Indiana and State of Pennsylvania, have invented certain new and useful Improvements in Horseshoe-Clamps, of which the following is a specification, reference being had to the accompanying drawings.

This invention relates to horseshoe clamps, and has for its primary object to provide a device for securely clamping the shoe upon the hoof of the horse and which will effectually hold the shoe against lateral or sidewise shifting movement relative to the hoof, and by the use of which relatively small fastening nails for the shoe may be employed.

It is another object of the invention to provide a device for the above purpose which may be easily and quickly applied to the hoof of the animal and will firmly hold the heel ends of the shoe in place so that they cannot spring loose and batter or injure the hoof of the animal.

It is a more particular object of the invention to provide a horseshoe clamp consisting of clamping bars permanently welded to the opposite sides of the shoe adjacent the heels thereof to extend upwardly over the hoof, and means connecting the free ends of the bars to tightly clamp the same together, said clamping bars affording a support for the animal's foot and preventing splitting or cracking of the hoof.

With the above and other objects in view, the invention consists in the improved combination, construction and arrangement of the several parts as will be hereinafter more fully described, subsequently claimed and illustrated in the accompanying drawing in which similar reference characters designate corresponding parts throughout the several views, and wherein :—

Figure 1:
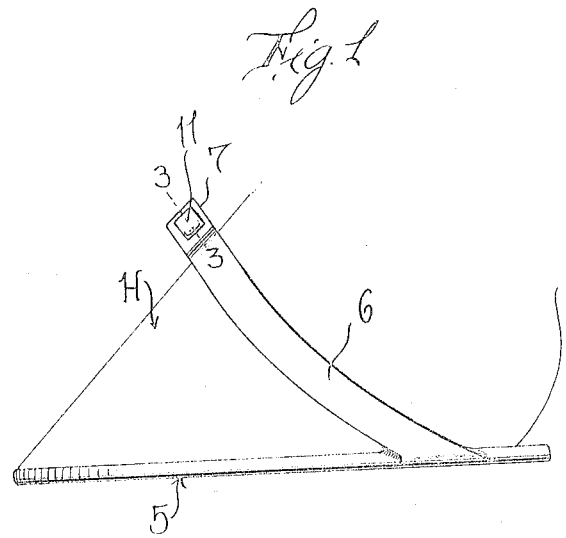
Figure 1 is a side elevation showing my improved shoe clamp applied to the animal's hoof.
Figure 2:
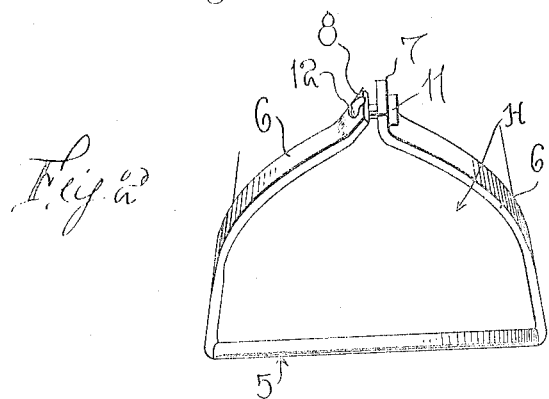
Fig. 2 is a front elevation thereof.
Figure 3:
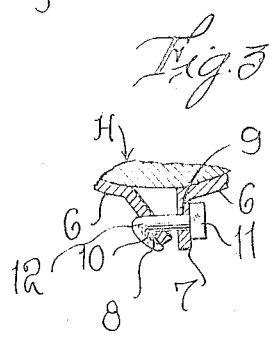
Fig. 3 is a detail section taken on the line 3—3 of Fig. 1.

Referring in detail to the drawing, 5 designates the horseshoe which is of the ordinary form and construction and is fitted to the hoof of the animal, indicated at H, in the usual manner. To the shoe 5 at opposite sides thereof and adjacent the heel ends of the shoe bar, the clamping bars 6 are permanently welded at one of their ends. These clamping bars are inwardly curved toward each other and obliquely inclined upwardly and forwardly toward the toe end of the shoe. One of the clamping bars 6 is provided at its upper end with an angularly bent terminal 7, and the corresponding end of the other bar 6 is also outwardly bent at its terminal at a slight angle with respect to said bar as shown at 8. These opposed terminals of the clamping bars 6 have openings formed therethrough as at 9 and 10 respectively.

After the hoof of the animal has been properly trimmed, the shoe 5 is applied thereto, the bars 6 extending forwardly and upwardly over the surface of the hoof. A fastening bolt 11 is then inserted through the opening 9 in the angular terminal 7 of one of the bars 6 and engaged through the opening 10 in the terminal 8 of the other of said clamping bars. The end portion of the bolt 11 is then bent over and firmly clenched down upon the terminal of the latter clamping bar as indicated at 12. Thus the bars 6 at their free ends are securely connected together and held in firm clamping engagement upon the hoof of the animal. It will be readily seen that by the use of my device, lateral twisting or shifting of the shoe upon the hoof is obviated, and relatively small fastening nails for the shoe may be employed, whereby the possibility of injury to the foot of the animal is obviated. My device also eliminates the necessity of providing the shoe with toe clips and holds the heel ends of the shoe firmly in place, and in addition, affords a firm support for the foot of the animal so that splitting or cracking of the hoof will likewise be obviated.

From the foregoing description taken in connection with the accompanying drawing, the construction, manner of use and several advantages of my invention will be clearly and fully understood. The device may be readily applied to the ordinary horseshoe by a blacksmith, and at very small additional cost. The shoe equipped with the hoof clamp can be very easily and quickly applied to the foot of the animal or removed. It is, of course, apparent that the shoes may be made in various sizes, and the width and length of the curved clamping bars correspondingly increased or decreased. The device is also exceedingly durable in its construction, as well as serviceable and reliable in practical use.

While I have herein shown and described the preferred form and construction of the several parts, it is to be understood that the same are susceptible of considerable modification and I therefore reserve the privilege of adopting all such legitimate changes as may be fairly embodied within the spirit and scope of the invention as claimed.

I claim:—

In combination with a horseshoe, clamping bars permanently welded at one of their ends to the opposite sides of the shoe adjacent the heel ends thereof, said bars being inwardly curved and obliquely inclined forwardly at an angle of substantially 45° toward the toe of the shoe, one of said bars terminating in an angularly disposed and forwardly projecting lug, and the other of said bars having its free end angularly bent and obliquely disposed in convergent relation to said lug, said angular end of the latter bar and said lug being apertured, and a connecting bolt adapted to be disposed through the apertures and clenched upon the obliquely disposed end of the latter bar to securely clamp said bars upon the hoof of an animal.

In testimony whereof I hereunto affix my signature in the presence of two witnesses.

ANDREW C. FERRIER.

Witnesses:
PARK HAWS,
SAMUEL E. YEAGER.